US011683688B2

(12) United States Patent
Jain

(10) Patent No.: US 11,683,688 B2
(45) Date of Patent: Jun. 20, 2023

(54) ROLE BASED OFDMA SUBCARRIERS ALLOCATION OVER WIRELESS NETWORKS USING RADIUS PROTOCOL

(71) Applicant: Fortinet, Inc., Sunnyvale, CA (US)

(72) Inventor: Ankur Jain, Bangalore (IN)

(*) Notice: Subject to any disclaimer, the term of this patent is extended or adjusted under 35 U.S.C. 154(b) by 105 days.

(21) Appl. No.: 17/487,258

(22) Filed: Sep. 28, 2021

(65) Prior Publication Data

US 2023/0100553 A1    Mar. 30, 2023

(51) Int. Cl.
| | |
|---|---|
| *H04W 48/16* | (2009.01) |
| *H04W 84/12* | (2009.01) |
| *H04W 76/10* | (2018.01) |
| *H04W 12/084* | (2021.01) |
| *H04W 72/0453* | (2023.01) |
| *H04L 5/00* | (2006.01) |
| *H04W 80/12* | (2009.01) |

(52) U.S. Cl.
CPC ......... *H04W 12/084* (2021.01); *H04L 5/0007* (2013.01); *H04W 48/16* (2013.01); *H04W 72/0453* (2013.01); *H04W 76/10* (2018.02); *H04W 80/12* (2013.01); *H04W 84/12* (2013.01)

(58) Field of Classification Search
CPC .............................. H04W 84/12; H04W 48/16
USPC .......................................................... 370/329
See application file for complete search history.

(56) References Cited

U.S. PATENT DOCUMENTS

2015/0029973 A1* 1/2015 Vesterinen ............ H04W 88/06
370/329

* cited by examiner

*Primary Examiner* — Angel T Brockman
(74) *Attorney, Agent, or Firm* — Law Office of Dorian Cartwright; Dorian Cartwright

(57) ABSTRACT

Access credentials for a user of each of the plurality of stations connecting to the Wi-Fi network are forwarded to a RADIUS server. In response to the forwarded access credentials, priority-token values derived from the access credentials of the connecting users for storage in association with a MAC address of each of the plurality of stations, are received from the RADIUS and stored. Priority-token values responsive to detecting multiple users of at least two different priorities needing to access the Wi-Fi network. Available subcarriers are allocated based on the priority-token values for data transmissions.

10 Claims, 6 Drawing Sheets

| Field | Description | |
|---|---|---|
| Attribute Number | 26 | 311 |
| Vendor-Specific Command Codes | 12356 (vendor code for Fortinet, similarly each vendor has its unique code) | 312 |
| Sub-Type Number | 1 | 313 |
| VSA Attribute Name | Sub-Carrier-Priority-Token | 314 |
| Description | This token will help AP to allocate user based OFDMA subcarriers. | 315 |
| Value | Integer: 2-octet (1, 2, 3, ..., 255.) | 316 |

310

320

HE MU-PPDU (High Level Diagram)

330

HE-SIG-B Field

US 11,683,688 B2

ROLE BASED OFDMA SUBCARRIERS ALLOCATION OVER WIRELESS NETWORKS USING RADIUS PROTOCOL

FIELD OF THE INVENTION

The invention relates generally to computer networking, and more specifically, to role-based OFDMA (orthogonal frequency division multiple access) subcarriers allocation over wireless networks using Radius protocol.

BACKGROUND

In the older WLAN standard (e.g., IEEE 802.11ac) only single-user station is allowed to uplink transmit at one point in time, although DL-MU-MIMO (downlink-multi user-multi input/multi output) from access point to non-access point stations has been supported through MIMO beamforming. Institute of Electrical and Electronic Engineers, or IEEE, promulgated IEEE 802.11ax WLAN as the first WLAN (wireless local access network) standard to use OFDMA to enable transmissions with multiple users simultaneously. Each user is assigned different subsets of subcarriers to achieve simultaneous data transmission in a multi user environment.

RU (Resource Unit) is a unit in OFDMA terminology used in 802.11ax WLAN to denote a group of subcarriers (tones) used in both downlink and uplink transmissions. Each subcarrier is carrying some useful data.

By the subcarrier allocation, stations may have lower or higher bandwidth based on no of subcarriers allocated to that station.

In WIFI-6E, thanks to OFDMA, two or more than two users can get the data simultaneously, it's because of one channel divided to multiple subcarriers and each group of subcarriers carries data based on RSSI and station type.

Problematically, RU and bandwidth cannot be allocated based on authority, responsibility, privilege and/or job competency of a person.

Therefore, what is needed is a robust technique for allocating OFDMA subcarriers based on roles of users when accessing wireless networks.

SUMMARY

These shortcomings are addressed by the present disclosure of methods, computer program products, and systems for allocating OFDMA subcarrier frequencies over a Wi-Fi network based on user role.

In one embodiment, connection requests and access credentials are received from a plurality of stations for access to the Wi-Fi network. The access credentials for a user of each of the plurality of stations connecting to the Wi-Fi network are forwarded. In response to the forwarded access credentials, priority-token values derived by a RADIUS (Remote Authentication Dial-In User Service) server from the access credentials of the connecting users for storage in association with a MAC address of each of the plurality of stations, are received and stored.

In another embodiment, priority-token values are looked-up and retrieved responsive to detecting multiple users of at least two different priorities needing to access the Wi-Fi network. Available subcarriers are allocated based on the priority-token values looked-up, with higher priority user roles having more bandwidth via subcarrier assignments. Data transmitted and received over the Wi-Fi is prioritized according to subcarrier assignments of the plurality of stations.

Advantageously, both network performance and computer hardware performance are improved by allocating more subcarriers frequencies to higher priority users of a Wi-Fi network.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for allocating OFDMA subcarrier frequencies over a Wi-Fi network based on user role.

In one example, hospital deployments of an enterprise network includes doctors, nursing staff, patients, housekeeping and attender might require most OFDMA bandwidth to nursing and doctors, medium bandwidth to patient, and low bandwidth to housekeeping and guest persons, when they are being participated in same downstream data carrying for multiple users simultaneously. One of ordinary skill in the art will recognize many additional variations made possible by the succinct description of techniques below. For example, OFDMA allocation is illustrated in the context of Wi-Fi 6E, but may be applied to other wireless standards capable of serving multiple stations simultaneously, as well.

I. Systems for Allocating OFDMA Subcarrier Frequencies Based on User Roles (FIGS. 1-2)

Figure 1:
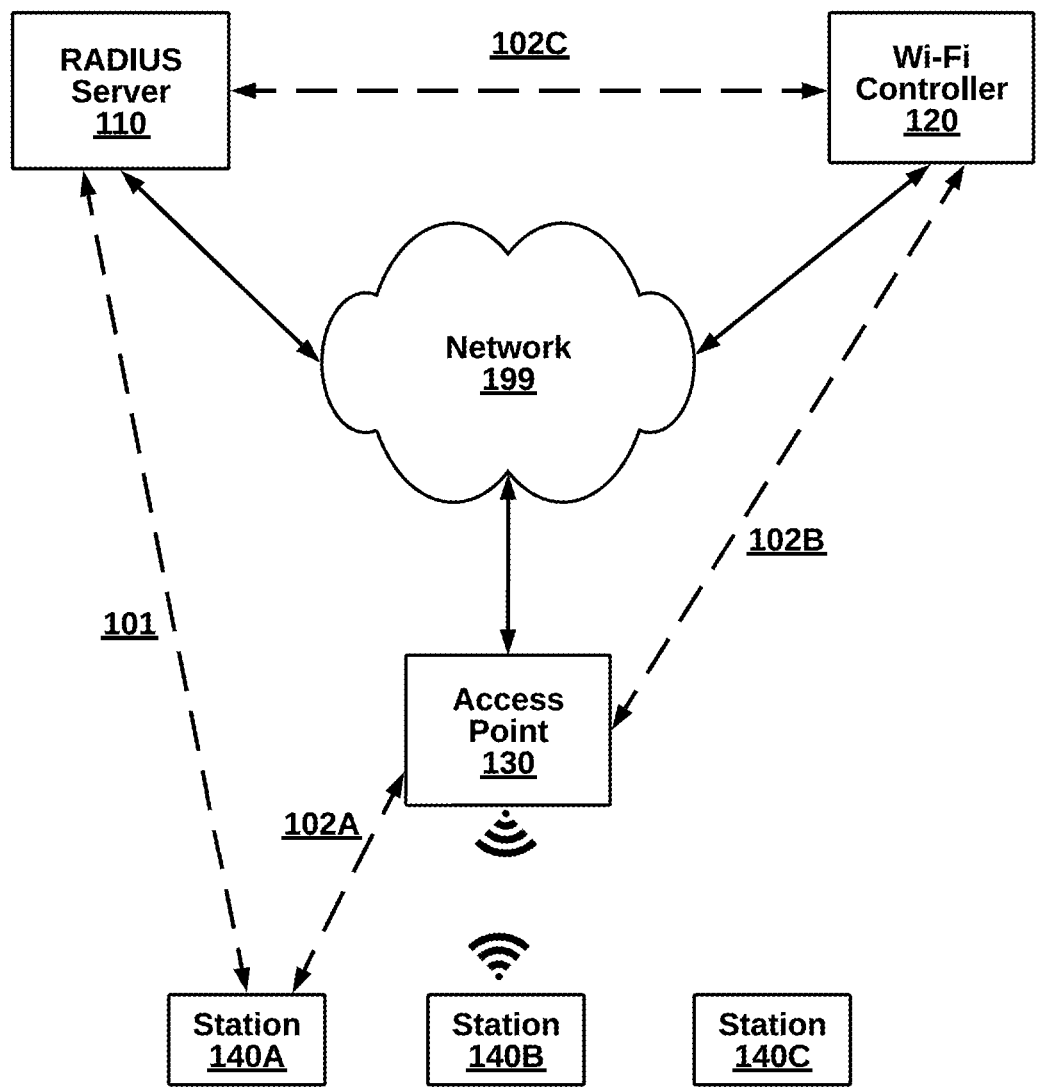
FIG. 1 is a high-level illustration of a system for allocating OFDMA subcarrier frequencies over a Wi-Fi network based on user role, according to an embodiment.
Figure 2:
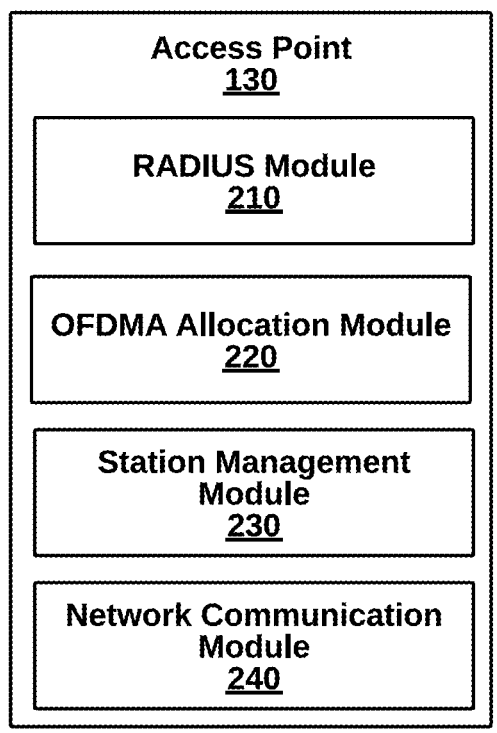
FIG. 2 is a more detailed illustration of an access point of the system of FIG. 1, according to an embodiment.

FIG. 1 is a high-level illustration of a system 100 for allocating OFDMA subcarrier frequencies over a Wi-Fi network based on user role, according to an embodiment. The system 100 includes, in part, a Wi-Fi controller 110, a RADIUS server 120, an access point 130 and a stations 140A-C. Many other embodiments are possible, for example, more or fewer access points, more or fewer stations, and additional components, such as firewalls, routers and switches. The system 100 components can be located locally on a LAN or include remote cloud-based devices, and can be implemented in hardware, software, or a combination similar to the example of FIG. 6.

The components of the system 100 are coupled in communication over a network 199. Preferably, the Wi-Fi controller 110, the RADIUS server 120 and the access point 130 are connected to the data communication system via hard wire. Other components, such as the stations 140A-C are connected indirectly via wireless connection. The network 199 can be a data communication network such as the Internet, a WAN, a LAN, WLAN, a cellular network (e.g., 3G, 4G, 5G or 6G), or a hybrid of different types of networks. Various data protocols can dictate format for the data packets (e.g., IEEE 802.11 a/b/g/ax or Bluetooth). The data packets can include a header and a payload storing data. When packets are transmitted using IEEE 802.11ax, there are 14 additional 80 MHz channels and 7 additional 160 MHz channels available for routers and smart devices.

In ordinary conditions without any accounting for priority, the access point 130 operating in 20 MHz has available 256 subcarriers. With 4 connected stations having equal priority, the access point 130 may allocate equal subcarriers, such as 52, 52, 52 and 52 for users 1, 2, 3 and 4, accordingly. By contrast, when taking priority into account, such as user 1>user 2>user 3>user 4, the access point 130 may allocate partially unequal or fully unequal subcarriers, such as 26, 52, 52 and 106 for users 1, 2, 3 and 4, respectively. A data path is shown in summary as data path 101 between station 140A and RADIUS server 110, and in detail as data path 102A, 102B and 102C between station 140A, access point 130, Wi-Fi controller 120, and RADIUS server 110, on an uplink path.

Similarly, in a stadium, based on entry pass tickets, users with high ticket pricing may get better OFDMA bandwidth compared to low ballers when they receive same download stream altogether carrying data for multiple users. In another implementation, authority, responsibility, privilege and/or job competency of a person, are factors for priority.

The RADIUS server 110 of the system 100, in an embodiment, determines a particular priority-value token (or value of a token) for a station while requesting access to a wireless data network. During the association process between a station and an access point, authentication credentials are submitted from the station, as data path 101. Generally, credentials validate a particular user or a particular station has permission to access a private data network. Credentials can take many different forms, such as username and password, PIN, biometric authentication, and the like. In one embodiment, a user role is derived from a username credential of an Access-Request message. One implementation of the RADIUS server 110 token assignments runs in the application layer and can use either TCP or UDP.

The priority-value tokens can be stored in database (local or remote) or a table stored in memory of the RADIUS server 110 for each user role. The token content can be a priority number or letter (e.g., 1, 2, 3 . . . 255; or A, B, C or D), a priority category, or the like. The information can be populated by a network administrator, a batch download, or entered into a user interface of an application, for example. In another example, the Wi-Fi controller 120 programmatically assigns priorities remotely based on network policies, through application layer communications. The information can be updated when new users are added to an enterprise network. The RADIUS server 110 generates a return data packet to authentication requests with priority information allowing the access point 130 to allocate subcarrier bandwidth.

Figure 3:
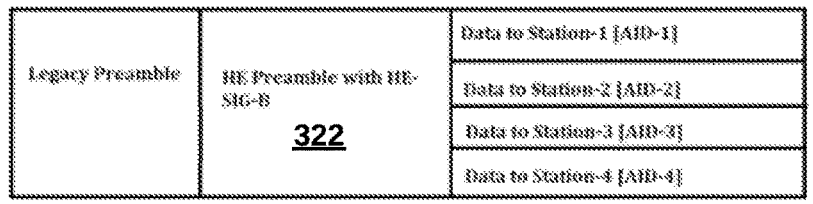
FIG. 3 is a block diagram illustrating examples of data packet formats for configuring subcarrier priority between remote devices over a data communication network, according to some embodiments.
Figure 3:
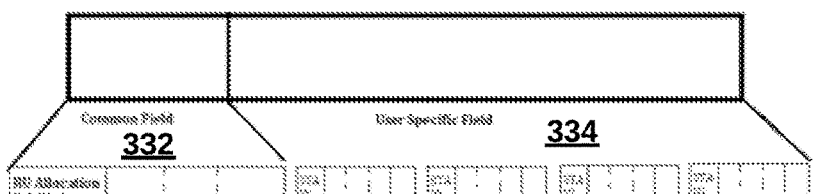

In more detail, tokens that are vendor specific can be communicated using VSA (vendor specific attribute), number 26 field 311, as shown in FIG. 3. Attribute 26 field 311 encapsulates vendor specific attributes, allowing vendors to support their own extended attributes otherwise not suitable for general use. Also shown are the vendor-specific command codes field 312, sub-type number field 313, VSA attribute name field 314, description field 315 and value field 316. More detail are set forth below. This extends the overall functionality of the RADIUS server 110 beyond that provided by public standard attributes, enabling implementation of this feature that improves administrative management tasks.

In another embodiment, the RADIUS server 110 also validates credentials submitted by a user or a station. Different users can be validated for different levels of access.

The Wi-Fi controller 120 processes authentication requests and authentication responses with the RADIUS server 110. Authentication requests are forwarded to the RADIUS server 110 when received from connecting stations. In one embodiment, the Wi-Fi controller 120 generates an Access-Request message on behalf of a connecting station. In response to a successful authentication match by the RADIUS server 110, an Accept-Accept message is received and parsed to expose the priority-token value.

The Wi-Fi controller 120, in an embodiment, enables roaming within an enterprise network. In the network hierarchy, the Wi-Fi controller 120 sits above the access point 130, as a global manager of access points. When the stations 140A-C roam from the access point 130 to a different one, the priority-token value can be sent to the new access point during the soft hand off procedures, in a manner that is transparent to the user and/or the user device. Roaming may occur as RSSI values of access points change a different points within network range. For instance, the Wi-Fi controller 120 tracks RSSI values and when a better RSSI value is available, a station can be transferred on the backend for service by the new access point, without choice.

In one embodiment, the access point 130 allocates subcarriers (e.g., Wi-Fi-6E subcarriers) based on a priority-token value derived from a user role associated with a connected station. During an initial association between the access point 130 and the stations 140A-C, credentials are passed from the stations 140A-C through the access point 130 to the RADIUS server 110. Credentials can be sent directly or indirectly via the Wi-Fi controller 120. In response, priority-token values are sent back for the access point 130 to use in determining allocations. In one embodiment, allocations are based solely on priority-token values. In another embodiment, allocations are further modified by additional allocation factors or algorithms, such as local conditions, station behavior, and user history, for example.

The access point 130 can notify the stations 140A-C of assignments, in one embodiment, using a resource allocation bitmap in a RU allocation subfield of common field of HE-SIG-B, as shown in FIG. 3. The bitmap can be formatted according to IEE standards for RU and user combinations, by private protocols, or others. The association-ID of users for the HE-MU-PPDU frame can be embedded in STA-ID field of user specific field of HE-SIG-B, as described further below in association with FIG. 3. Ultimately, a Wi-Fi transceiver transmits and receives data packets over the Wi-Fi network prioritized according to subcarrier assignments of the stations. Transmissions on wired network can have similar priority allocations, be partially related to access point allocations, or have completely independent wired allocations for channel access (e.g., round robin). In an embodiment, the access point 130 searches the database for priority-value tokens when it has DL-OFDMA data to send. The search can be bypassed, for efficiency, when the data is non-DL-OFDMA data.

More generally, the access point 130 provides wireless data access for the stations 140A-C to the backbone network with a Wi-Fi or other wireless interface and an Ethernet or other wired interface. Beacon frames broadcast by the access point 130 advertise their presence and services. A probe request is received from the stations 140A-C once the access point 130 is chosen among those available, along with access credentials. A probe request is sent in return as the association process is completed in preparation for wireless access. More details about the access point 130 are set forth below in association with FIG. 2.

The stations 140A-C can be stationary or roaming around an enterprise network. Example implementations include a smartphone, a network appliance, a PC, a tablet, or other device. Upon receiving beacons from nearby access points, the stations 140A-C can initiate a Wi-Fi access connection with a probe request. When a probe response is received, the stations 140A-C can begin access to the Internet or other network. A subcarrier assignment is received from the access point 130.

FIG. 2 is a more detailed illustration of the Wi-Fi controller 110 of the system 100 of FIG. 1. The Wi-Fi controller 110 includes a RADIUS module 210, an OFDMA allocation module 220, a DHCP reconfiguration module 230, a RA (router advertisement) reconfiguration module 235, and a network communication module 240. The modules can be implemented in source code stored in non-transitory memory executed by a processor. Alternatively, the modules can be implemented in hardware with microcode. The modules can be singular or representative of functionality spread over multiple components.

The RADIUS module 210 forwards access credentials for a user of each of the plurality of stations connecting to the Wi-Fi network, and in response. The RADIUS module 220 also receives priority-token values derived from the access credentials of the connecting users for storage in association with a MAC address of each of the plurality of stations.

The OFDMA allocation module 220 to look-up priority-token values responsive to detecting multiple users of at least two different priorities needing to access the Wi-Fi network, and to allocate available subcarriers based on the priority-token values looked-up. In one example, as illustrated in FIG. 3, an HE-MU PPDU frame 320 with HE preamble and HE-SIG-B field 322, are shown. One frame transmission downlink embeds several independent payloads for multiple stations, modulated into specific subcarriers. Access point 130 embeds subcarrier information for multiple users using an RU allocation subfield of a common field 332 of HE-SIG-B 330. The common field 332 contains information on how the channel is subdivided for the data part, using a bit pattern. Further, the access point 130 embeds an association-ID of users which are part of the HE-MU-PPDU frame 330 in STA-ID field of a user specific field 344 of HE-SIG-B 340. The association-ID is assigned by the access point 130 during connection. The user specific field 344 for each of the receiving stations contains, a receiving station association ID (AID), a number of spatial streams, use of transmit beamforming, the MCS, the use of DCM (Dual Carrier Modulation) or not, and a coding scheme (e.g., BCC or LDPC).

To execute allocations, the network communication module 230 comprises a Wi-Fi transceiver to transmit and receive data over the Wi-Fi prioritized according to subcarrier assignments of the plurality of stations. The network communication module 240 may include other channel communication peripherals, such as protocol software, transceivers, antenna, input/output ports, and the like.

II. Methods for Allocating OFDMA Subcarrier Frequencies Based on User Roles (FIGS. 4-5)

Figure 4:
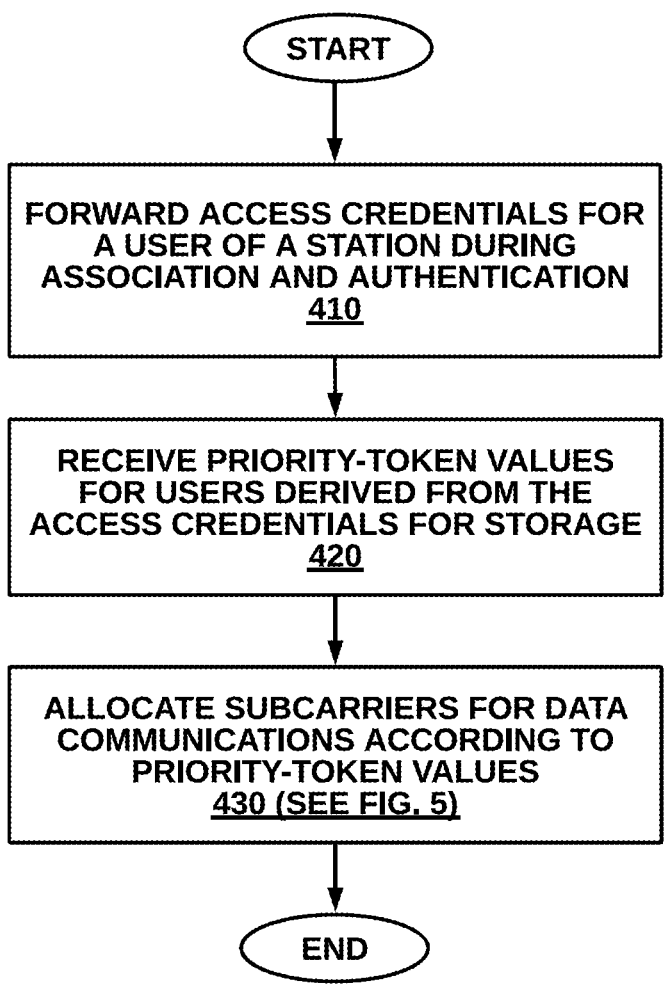
FIG. 4 is a high-level flow diagram illustrating a method for allocating OFDMA subcarrier frequencies over a Wi-Fi network based on user role, according to one preferred embodiment.
Figure 5:
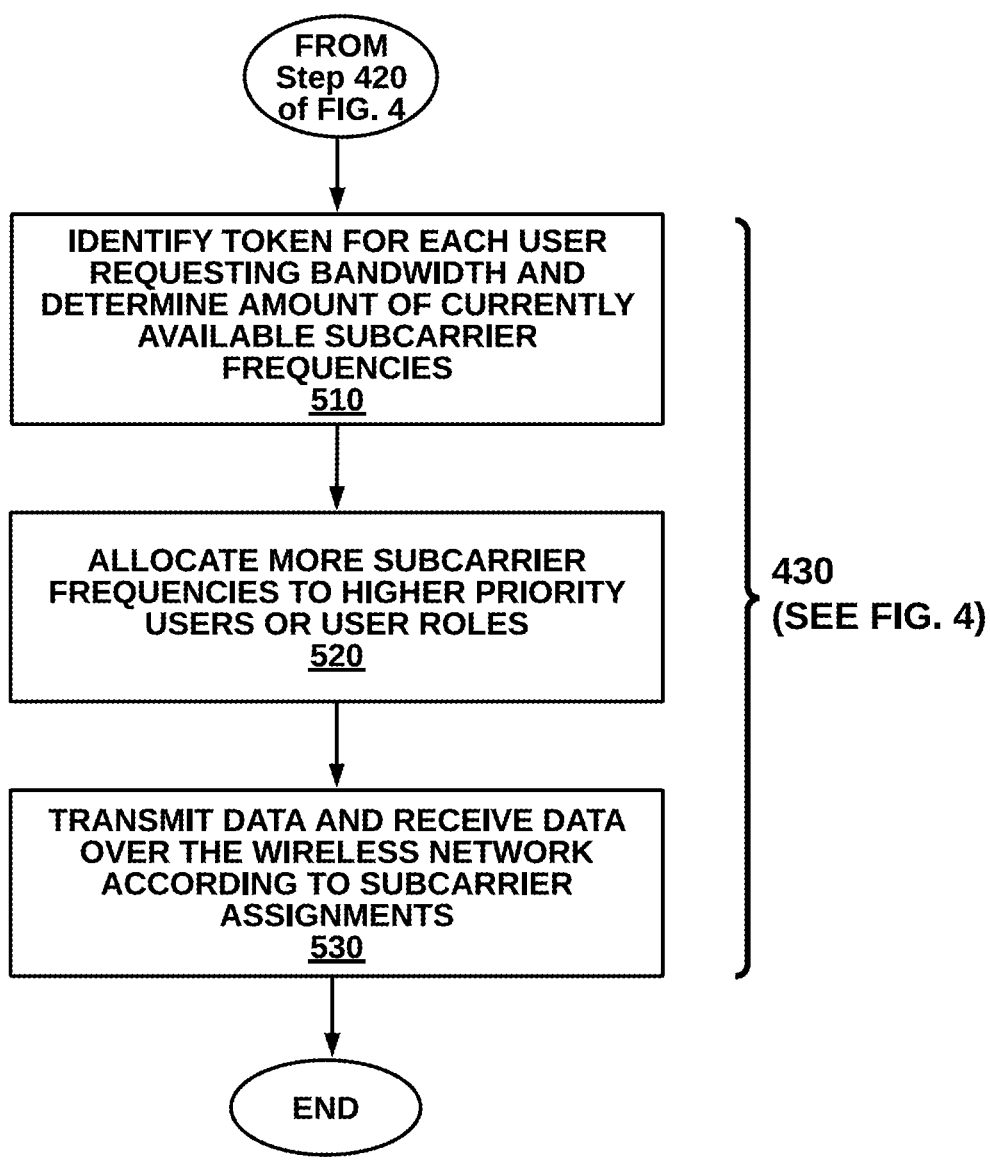
FIG. 5 is a more detailed flow diagram illustrating the step of allocated carriers for data communications, according to the priority-token value, for the method of FIG. 4, according to one embodiment.

FIG. 4 is a high-level flow diagram illustrating a method for allocating OFDMA subcarrier frequencies over a Wi-Fi network based on user role, according to one embodiment. The method 400 can be implemented, for example, by the system 100 of FIG. 1. The steps are merely representative groupings of functionality, as there can be more or fewer steps, and the steps can be performed in different orders. Many other variations of the method 400 are possible.

Priority level for a user role is configured during association and authentication for the station. To do so, at step 410, access credentials for a user of each of the plurality of stations connecting to the Wi-Fi network are forwarded to a RADIUS server on behalf of a station. The access credentials are presented by a user, a station, or an application. The credentials can be transmitted over a wired network directly to a RADIUS server or to a Wi-Fi controller for indirect submission.

In response, at step 420, priority-token values are received back from a RADIUS server. The tokens are derived from the access credentials of the connecting users are received for storage in association with a MAC address of each of the plurality of stations. Tokens can be updated periodically or responsive to an event.

At step 430, subcarriers are allocated for data communications, according to the priority-token value. FIG. 5 shows more details concerning the allocation. To this end, at step 510, a real-time snapshot is taken to identify all users requesting access and available resources in subcarrier frequencies. At step 520, priority-token value is looked-up and retrieved responsive to detecting multiple users of at least two different priorities needing to access the Wi-Fi network. Many variations are possible. At step 520, available subcarriers are allocated based on the priority-token values looked-up. User roles can be based on importance in an organization, for example, a CEO, a network administrator or an owner would have higher priority than a guest or non-essential personnel. At step 530, data is transmitted and received over the Wi-Fi network. The data traffic is prioritized according to subcarrier assignments of the plurality of stations. In particular, specific subcarriers are accessed by specific stations. Many other variations are possible.

III. Generic Computing Device (FIG. 6)

Figure 6:
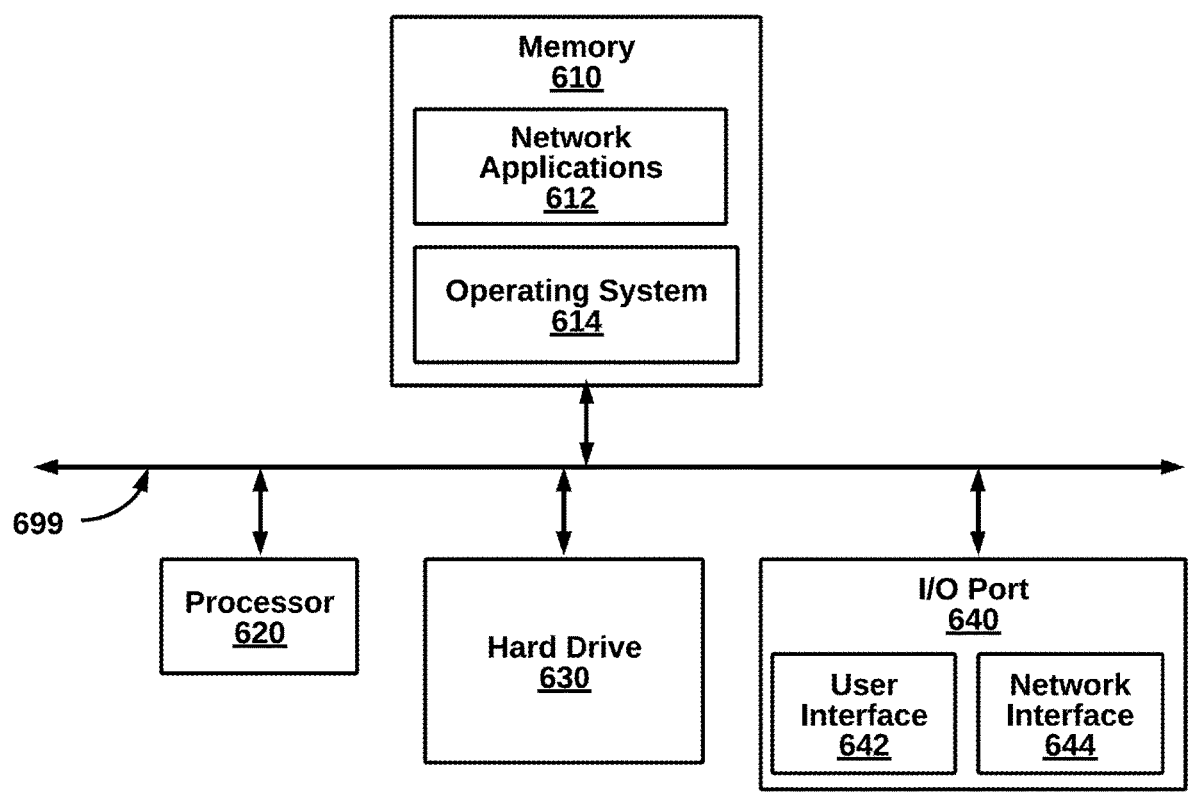
FIG. 6 is an example of a computing environment, according to an embodiment.

FIG. 6 is a block diagram illustrating an example computing device 600 for use in the system 100 of FIG. 1, according to one embodiment. The computing device 600 is implementable for each of the components of the system 100, such as the RADIUS server 110, the Wi-Fi controller 120, the access point 130 and the stations 140A-C. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 620 can be a network processor (e.g., optimized for IEEE 802.11, IEEE 802.11AC or IEEE 802.11AX), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. An access point coupled to a data communication network, for allocating OFDMA subcarrier frequencies over a Wi-Fi network based on user role, the access point comprising:
   a processor;
   a network interface, communicatively coupled to the processor, the data communication network and the Wi-Fi network; and
   a memory, communicatively coupled to the processor and storing:
      a station management module to receive connection requests and access credentials from a plurality of stations for access to the Wi-Fi network;
      a RADIUS module to forward access credentials for a user of each of the plurality of stations connecting to the Wi-Fi network, and in response, to receive priority-token values derived from the access credentials of the connecting users for storage in association with a MAC address of each of the plurality of stations; and
      an OFDMA allocation module to look-up priority-token values responsive to detecting multiple users of at least two different priorities needing to access the Wi-Fi network, and to allocate available subcarriers based on the priority-token values looked-up,
   wherein the network interface comprises a Wi-Fi transceiver to transmit and receive data over the Wi-Fi prioritized according to subcarrier assignments of the plurality of stations.

2. The access point of claim 1, wherein the priority-token-value is encapsulated in a VSA (vendor-specific attribute) field of a data packet received and parsed by the access point.

3. The access point of claim 1, wherein the RADIUS module forwards access credentials to a Wi-Fi controller, and receives the priority-token-value from the Wi-Fi access controller after parsing.

4. The access point of claim 3, wherein the Wi-Fi controller forwards an Access-Request message to a RADIUS server, and receives a priority-token-value in an Access-Accept message in response to passing authentication from the RADIUS server.

5. The access point of claim 1, wherein the priority-access-token is specific to a vendor of the access point, wherein command codes for a first vendor are distinct from command codes of a second vendor.

6. The access point of claim 1, to bypass looking-up priority-token values responsive to bandwidth usage below a predetermined threshold.

7. The access point of claim 1, to bypass looking-up priority-token values responsive to non-OFDMA data to be sent.

8. The access point of claim 1, wherein the Wi-Fi network and at least two of the plurality of stations operate according to the Wi-Fi 6E protocol.

9. A method in an access point coupled to a Wi-Fi network, for allocating OFDMA subcarrier frequencies over a Wi-Fi network based on user role, the method comprising the steps of:
   receiving connection requests and access credentials from a plurality of stations for access to the Wi-Fi network;
   forwarding access credentials for a user of each of the plurality of stations connecting to the Wi-Fi network;
   receiving, in response to the forwarded access credentials, priority-token values derived from the access credentials of the connecting users for storage in association with a MAC address of each of the plurality of stations;
   looking-up priority-token values responsive to detecting multiple users of at least two different priorities needing to access the Wi-Fi network;
   allocating available subcarriers based on the priority-token values looked-up;
   transmitting and receive data over the Wi-Fi prioritized according to subcarrier assignments of the plurality of stations.

10. A non-transitory computer-readable media in an access point coupled to a Wi-Fi network for, when executed by a processor, for allocating OFDMA subcarrier frequencies over a Wi-Fi network based on user role, the method comprising the steps of:
   receiving connection requests and access credentials from a plurality of stations for access to the Wi-Fi network;
   forwarding access credentials for a user of each of the plurality of stations connecting to the Wi-Fi network;
   receiving, in response to the forwarded access credentials, priority-token values derived from the access credentials of the connecting users for storage in association with a MAC address of each of the plurality of stations;
   looking-up priority-token values responsive to detecting multiple users of at least two different priorities needing to access the Wi-Fi network;
   allocating available subcarriers based on the priority-token values looked-up;
   transmitting and receive data over the Wi-Fi prioritized according to subcarrier assignments of the plurality of stations.

* * * * *